United States Patent Office.

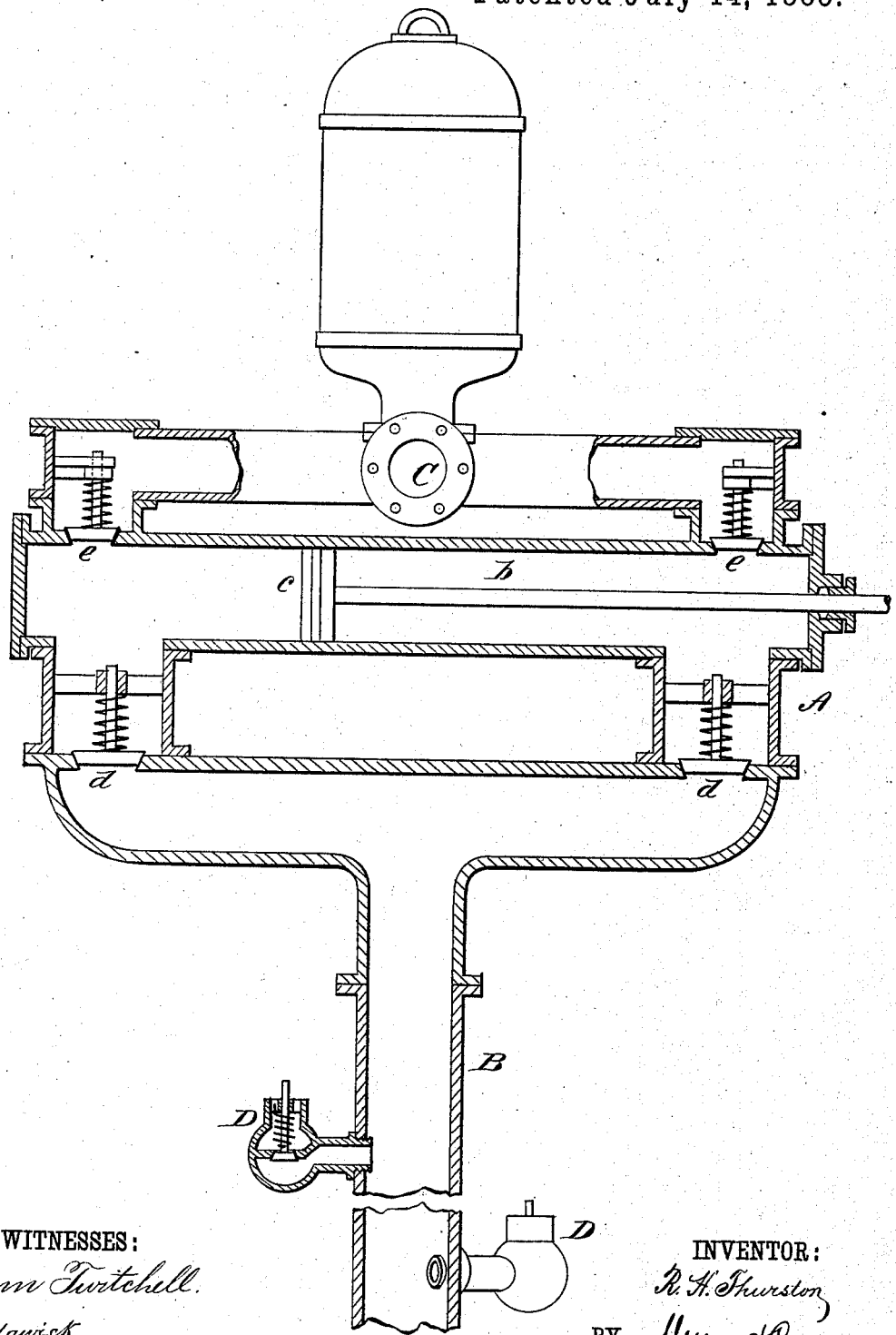

ROBERT H. THURSTON, OF HOBOKEN, NEW JERSEY.

APPARATUS FOR PURIFYING WATER.

SPECIFICATION forming part of Letters Patent No. 322,332, dated July 14, 1885.

Application filed April 18, 1885. (No model.)

*To all whom it may concern:*

Be it known that I, ROBERT H. THURSTON, of Hoboken, in the county of Hudson and State of New Jersey, have invented a new Improvement in Means for Purifying Water Supplied Under Head or Pressure, of which the following is a full, clear, and exact description.

My invention more especially relates to the purifying of water for drinking and other purposes supplied to cities and towns under head or pressure, as under the pumping systems now generally in use.

The principles upon which the invention is based may be briefly explained as follows: It is well known from experience dating back some centuries that water containing organic matter, as is commonly the case in our modern systems of supplying water to cities and towns, can be purified by the introduction of air, which element, by the oxygen contained in it, oxidizes all substances that are oxidizable, thus leaving the water pure and wholesome. It is even found that the natural flow of a stream previously polluted will often in the course of a few miles when in contact with or exposed to the atmosphere and the sun's rays give complete freedom from the poisonous or deleterious substances which may have been held in solution. Furthermore, it has become known that the action of water in dissolving oxygen is accelerated by pressure, and that the oxidation of injurious elements is aided by solution of oxygen under pressure, and there have been invented devices by which the solution of air and of oxygen and its useful effects have been secured by the introduction of the gases under pressure.

Availing myself of these well-known facts, the invention which I have devised has for its object the introducing of a copious supply of air into the forcing-main leading to the reservoir that supplies the city or town, for the purpose of purifying the water by oxidation. To this end I introduce the air or purifying gas under pressure into the rising main or delivery side of a pumping system by attaching to the suction side of the pump or its connections one or more air-valves of suitable construction and size to admit the desired quantity of air for aeration of the water-supply, or of such part of the supply as may be considered desirable. These valves may be of any desired kind. Thus they may be in the form of screw or stop valves or any other convenient form, including valves of the well-known clack or check constructions, the form of valve being immaterial, excepting as a matter of convenience or economy. It is preferred, however, to introduce the air with which the water is to be charged as low as possible in the suction-pipe or its connecting-pipes, if any, and to introduce it at several points instead of one, whereby the aeration will be more effective, and the action of the pump will be less likely to be affected by the presence of the entering air, which will thus be permitted more time to enter into solution, as well as by the air being broken up into small streams restraining it from passing to or through the pump in large masses.

Reference is had to the accompanying drawing, which forms part of this specification, and which illustrates a sectional view of one form of pumping apparatus for supplying water under a head or pressure, with attached means for charging the water with the necessary supply of air to oxidize organic matter therein, such form of apparatus serving as well as any other to illustrate my invention for purifying the water as supplied to a town or city from a rising main or other reservoir.

A indicates a double-acting suction and force pump of ordinary construction, $b$ being its barrel, $c$ its piston or plunger, $d\ d$ its inlet-valves, and $e\ e$ its outlet-valves.

B is the suction-pipe, and C the delivering-pipe or outlet to the rising main or reservoir.

D D are clack or other valves connected with the suction-pipe, and arranged to admit air in suitable quantities to oxidize organic matter contained in the water, or otherwise to purify it, and which air is distributed through the water and forced under pressure along with the water by the action of the pump into the rising main or reservoir or other place of discharge with which the outlet C connects and from which the supply of water is drawn or taken as required.

Having thus described my invention, I claim as new and desire to secure by Letters Patent—

In pumping systems suitable for supplying cities and towns with potable water under head or pressure, the combination, with the pumping apparatus, of one or more valves arranged on the suction side of the pump and
5 constructed to admit air by the action of the pump into the water on said suction side for subsequent expulsion along with the water by the pump, substantially as and for the purpose herein set forth.

ROBERT H. THURSTON.

Witnesses:
ALVIN P. KLETZOCH,
FREDK. B. OGDEN.